United States Patent [19]

Schaefer

[11] 4,075,912

[45] Feb. 28, 1978

[54] TRANSMISSION WITH SUMP OIL LEVEL RESPONSIVE CONTROLS

[75] Inventor: Robert H. Schaefer, Westfield, Ind.

[73] Assignee: General Motors Corporation, Detroit, Mich.

[21] Appl. No.: 752,460

[22] Filed: Dec. 20, 1976

[51] Int. Cl.² .................. B60K 41/04; F16K 21/18
[52] U.S. Cl. ............................. 74/867; 74/868; 137/386; 137/393
[58] Field of Search ........... 74/867, 868, 864, DIG. 1; 137/386, 393

[56] References Cited

U.S. PATENT DOCUMENTS

| 3,020,924 | 2/1962 | Davies | 137/386 |
|---|---|---|---|
| 3,174,503 | 3/1965 | Absolon | 137/393 |
| 3,269,404 | 8/1966 | Lebow | 137/199 |
| 3,335,746 | 8/1967 | Lebow | 137/389 |
| 3,429,323 | 2/1969 | Mott | 137/81.5 |
| 3,561,465 | 2/1971 | DeGraaf | 137/81.5 |
| 3,587,355 | 6/1971 | Schafer | 74/868 |
| 3,590,843 | 7/1971 | Meyer | 137/81.5 |
| 3,691,872 | 9/1972 | Schaefer et al. | 74/864 |
| 3,703,907 | 11/1972 | Richards | 137/81.5 |

Primary Examiner—Leonard H. Gerin
Attorney, Agent, or Firm—A. M. Heiter

[57] ABSTRACT

A multiratio powershift transmission having automatic speed and torque demand responsive shift controls providing a normal shift program when the sump oil level is in the normal operating range. When the sump oil level is in an abnormal operating range, either lower or higher than the normal operating range, a sump oil level responsive control acts on the shift controls to provide an abnormal shift program preventing drive in the highest gear ratio and providing normal operation in the other gear ratio.

9 Claims, 7 Drawing Figures

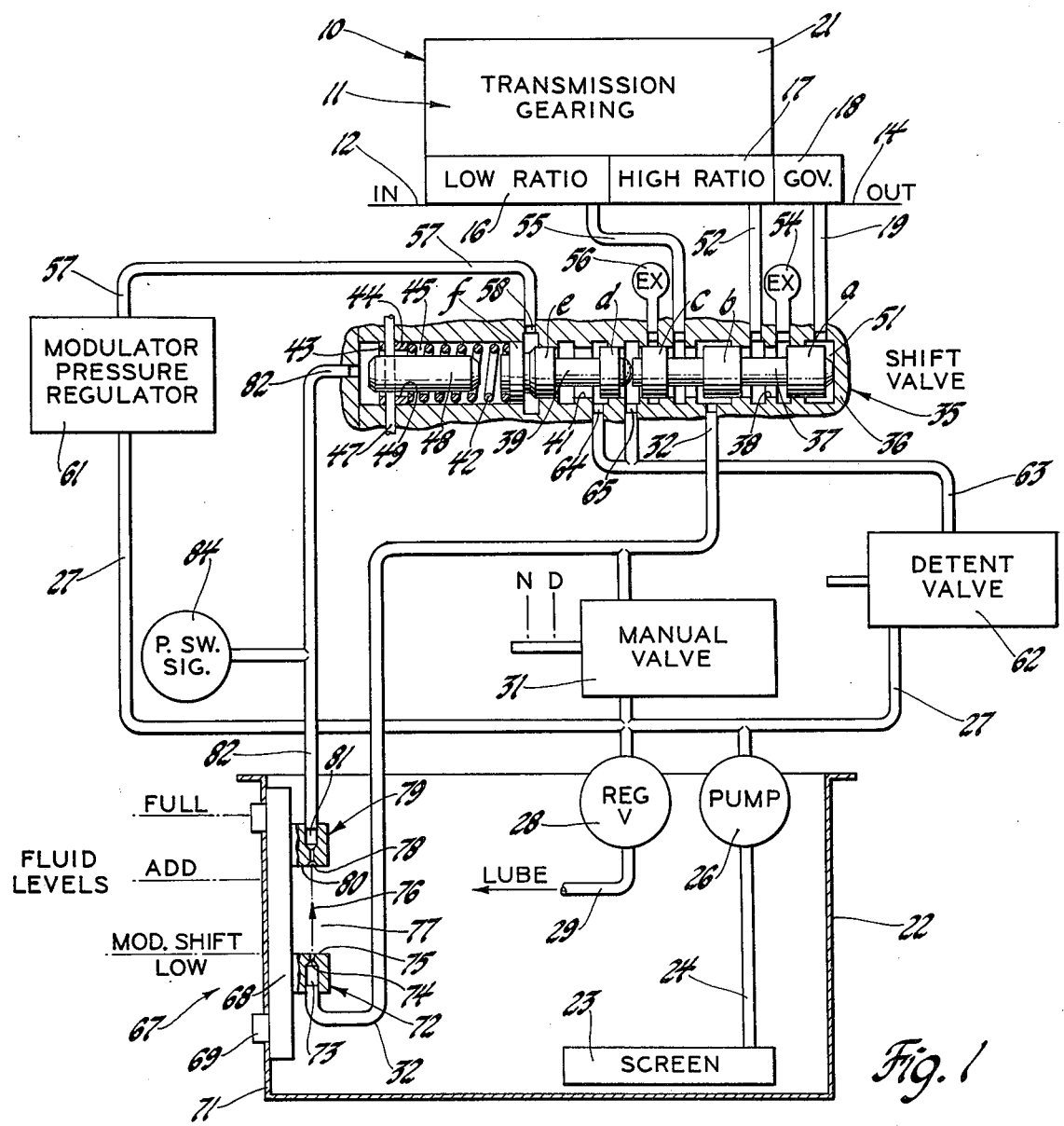
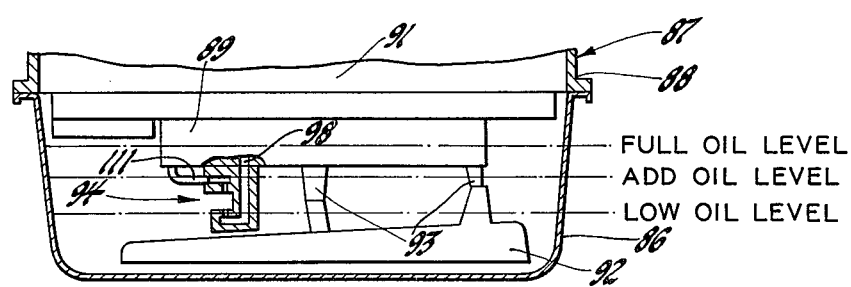
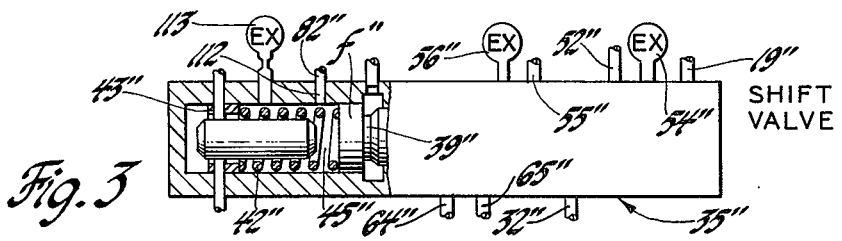

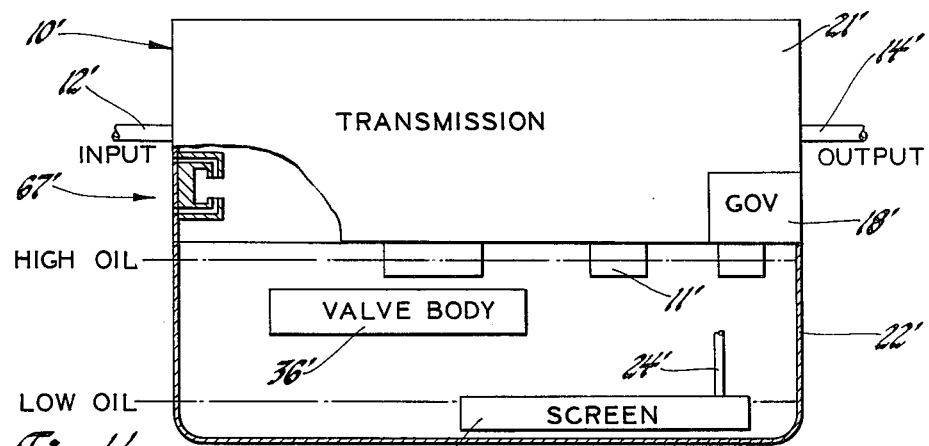
Fig. 4
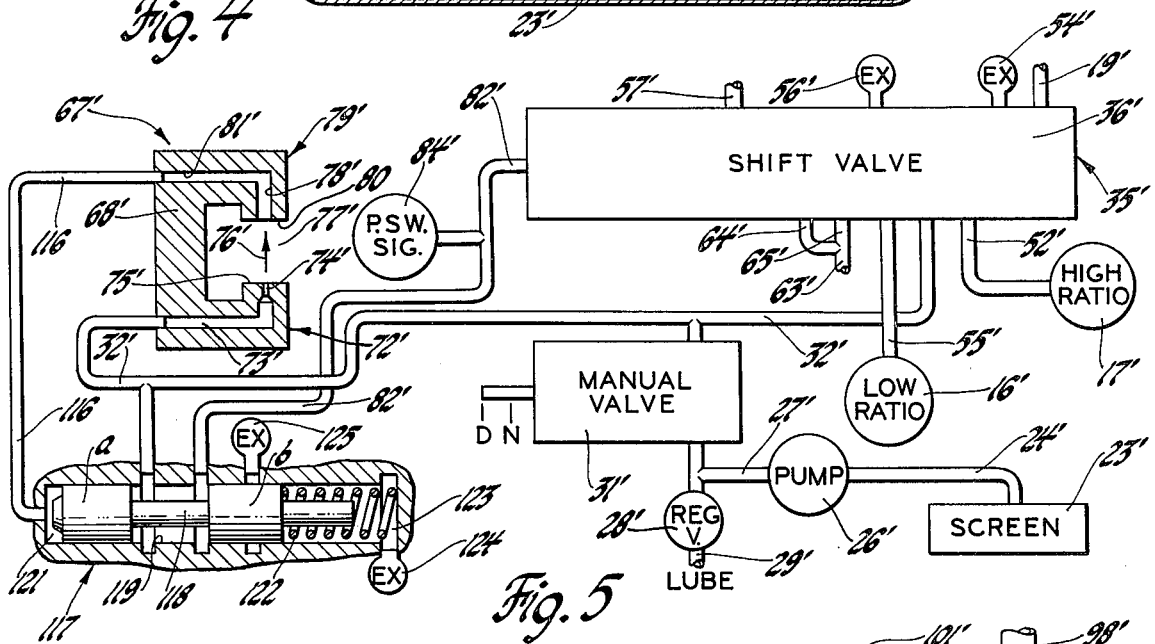
Fig. 5
Fig. 6
Fig. 7

TRANSMISSION WITH SUMP OIL LEVEL RESPONSIVE CONTROLS

The invention relates to transmissions and particularly transmissions having an oil level responsive control for modifying transmission operation.

The invention provides in a multiratio transmission having shift controls, a sump containing a fluid supply and a fluid supply system for supplying fluid from the sump to the transmission, a sump fluid level responsive control operative in response to sump fluid levels in a normal operating range of sump oil levels to permit normal transmission operation and operative in response to sump fluid levels beyond the normal operating range in an abnormal range of sump fluid levels to positively provide controlled abnormal transmission operation in a phase of transmission operation to indicate abnormal oil level condition and to continue drivable transmission operation in a phase of transmission operation.

The invention provides in multiratio powershift transmissions having fluid operated power shift controls, a sump fluid level control operative in response to the normal sump fluid level range to provide normal shift operation, and in response to an abnormal sump fluid level range while the pressure source of the shift controls provides sufficient pressure for substantially normal drive operation, to provide abnormal drive operation in one phase and normal drive operation in another phase.

In one arrangement, the abnormal sump fluid level is below the normal sump fluid level range. In another arrangement, the abnormal sump fluid level is both above and below, the normal sump fluid level range. The fluid level responsive control, in response to abnormal fluid level, preferably functions to control the shift controls to prevent an upshift to the highest ratio drive, and to provide a downshift from the highest ratio drive to prevent operation in the highest ratio drive. In a modification, only an upshift to the highest ratio drive is prevented.

The invention is employed in a multiratio powershift transmissions having automatic speed and torque demand shift controls in which the fluid level responsive control provides, in the normal sump fluid level range, the normal automatic shift program and, in the abnormal sump fluid level range, an abnormal automatic shift program, having abnormal operation in one phase and normal operation in another phase, especially by preventing operation in the highest ratio drive, or by preventing an upshift to the highest ratio drive.

The fluid level responsive control, in one arrangement, employs a fluidic jet device supplied with fluid pressure employed to establish the two highest ratio drives, the penultimate and highest ratio drive. This fluid supply is directed to the fluidic jet device sending portion which provides a free jet stream across an air gap to a receiving portion during abnormally low sump fluid level to provide a low fluid level signal in the receiving portion. During normal sump fluid level, sump fluid enters the gap to discontinue the low oil level signal. The sending portion has a jet nozzle providing a vertically upwardly directed jet stream with the jet outlet face at or slightly below the transition fluid level, between the normal fluid level range and the low fluid level range, to provide a sudden or high rate signal pressure change with small fluid level change at the transition level.

The fluid level responsive control, in another arrangement, employs a fluidic jet device positioned above all sump fluid levels. When the sump fluid level is abnormally low, the fluid pump will suck air through the pump intake and pump aerated fluid to the transmission controls. Also, when the sump fluid level is abnormally high and contacts transmission gearing, the fluid will be frothed or aerated. The fluidic jet device provides a signal pressure, since nonaerated fluid provides a jet stream crossing the air gap, indicating normal sump fluid level. Since aerated fluid does not cross the air gap to provide a signal, the signal pressure is substantially reduced. The absence of the normal sump fluid level signal indicates abnormal sump fluid level and is used to provide abnormal transmission operation in one phase of operation. The fluidic jet device is more sensitive to aerated fluid and thus provides the abnormal oil level signal before aerated fluid causes abnormal operation in all phases of transmission operation.

These and other features of the invention will be more apparent from the following description and the accompanying drawings of the preferred embodiments, wherein:

FIG. 1 is a diagrammatic view of the transmission and control system;

FIG. 2 shows the arrangement of control components in the sump with parts in section to show details;

FIG. 3 is a partial view, with parts in section, of a modified shift valve to show a modification of the FIG. 1. controls;

FIG. 4 shows the arrangement of transmission and control components of a modified transmission and control system;

FIG. 5 is a diagrammatic view of the FIG. 4 modified transmission and control system;

FIG. 6 is an enlarged sectional view of a fluidic jet device; and

FIG. 7 is an enlarged sectional view of a modified fluidic jet device.

The controls described below, for providing a signal changing the normal transmission control characteristics by preventing a shift from the penultimate ratio drive to the highest ratio drive in response to improper or abnormal fluid or oil level in the sump 22, are employed in a conventional multiratio transmission 10 having two or more ratio drives, powershift control and automatic speed and torque demand ratio control, as shown, for example, in U.S. Pat. No. 3,587,355 Schaefer, granted June 28, 1971, and in the Schaefer and Fox U.S. Pat. No. 3,691,872, granted Sept. 19, 1972, and incorporated herein by reference.

FIG. 1 is a simplified diagrammatic view of such a transmission, having two ratio drives and illustrative of transmissions having more than two ratio drives. The transmission 10 has conventional powershift gearing 11 drive connecting the input shaft 12 to the output shaft 14 and selectively controlled by fluid operated low ratio drive device 16 to provide or establish a low or penultimate ratio drive, and fluid operated high ratio drive device 17 to provide or establish a high or highest ratio drive. A governor 18, driven by output shaft 14 is conventionally supplied with transmission control fluid and supplies governor pressure proportional to output speed to governor line 19. The transmission 10 has a housing 21 with a sump 22, shown diagrammatically below in FIG. 1. The intake screen 23 is located in the bottom of sump 22 and is connected by intake line 24 to pump 26 which is drive connected to input shaft 12. When input shaft 12 is driven by the engine, pump 26 supplies fluid to mainline 27. Regulator valve 28 regulates the fluid pressure in mainline 27, and the overage is connected by overage line 29 to the lubrication system. Mainline 27 or overage line 29 may be used to supply governor 18.

The manual valve 31 selectively blocks mainline 27 in a neutral [N] position and connects mainline 27 to drive line 32 in forward drive [D] position. The shift valve 35 in valve body 36 has valve element 37, having lands $a$, $b$, and $c$, with the land $a$ having a slightly smaller diameter than equal diameter lands $b$ and $c$, located in stepped bore 38, and a control element 39, having progressively larger diameter lands $d$, $e$, and $f$, in a stepped bore 41. A spring 42, seated on fixed abutment 43, biases control element 39 and valve element 37 to the downshift position shown (FIG. 1). The abutment 43 has a ring 44 mounted in spring chamber 45, a portion of bore 41, and secured by pin 47, to valve body 36. The ring 44 may be constructed so it can be manually axially adjusted, as shown in the above Schaefer U.S. Pat. No. 3,587,355. A valve stop 48 is also secured by pin 47 in valve stop position. There is a fluid passage 49 between valve stop 48 and ring 44 for fluid communication between both ends of the spring chamber 45.

With shift valve 35 in the downshift position shown, governor pressure in line 19 connected to governor chamber 51 provides an upshift bias force. The high apply line 52 is connected between valve element lands 37$a$ and $b$ to exhaust 54 to disengage high ratio drive device 17. The drive line 32 is connected between lands 37$b$ and $c$ to low apply line 55 to engage low ratio drive device 16. Exhaust 56 is blocked by land 37$c$. The inverted modulator pressure line 57 is connected by its port 58 to control element bore 41 to act on the differential area of largest control element land 39$f$, the area of land 39$f$ less the smaller area of land 39$e$, to provide a torque demand bias force decreasing with increasing torque demand acting in opposition to the spring bias force, to provide a net downshift bias force in downshift position increasing with increasing torque demand. When the governor upshift bias force overcomes the net downshift bias force to upshift shift valve 35, drive line 32 is connected to high apply line 52 to apply high ratio device 17 and provides the mainline hysteresis force, since apply pressure acts on the differential area between larger land 37$b$, and smaller land 37$a$. Low apply line 55 is connected between lands 37$b$ and $c$ to exhaust 56. Also, in upshift position, inverted modulator pressure in line 57 is connected by its port 58 to act on the larger differential area between control element largest land 39$f$ and smallest land 39$d$, providing a larger torque demand bias force opposing the spring bias force to provide a lower net downshift bias force in upshift position, so downshifts occur at a lower output speed than upshifts. The hysteresis force or difference between upshift speed and downshift speed decreases with increasing throttle or torque demand during normal automatic torque demand and speed responsive shifting. During normal fluid level operation, the shift valve spring chamber 45 is connected to exhaust through the low fluid level signal line 82 which is exhausted by port 78 at receiving portion 79 described below.

The mainline 27 is connected to conventional modulator pressure regulator 61, which is controlled by throttle pedal position, engine vacuum, or other torque demand signal, and provides an inverted torque demand modulated pressure in line 57, which decreases with increasing torque demand, and to a conventional detent valve 62 which is controlled by throttle pedal position or other torque demand signal, and provides at full-throttle or torque demand a regulated detent pressure in line 63, as shown in the above U.S. Pat. Nos. 3,587,355 and 3,691,872. The detent line 63 is connected to ports 64, 65, of shift valve 35 to supply detent pressure to the space between the shift valve element 37 and control element 39 to disable control element 39 and provide shift valve operation for detent upshifts and downshifts in response to output speed at higher speed values than during the above-described normal automatic shifting in response to inverted modulator pressure and output speed.

A fluidic jet device 67 is located in the sump 22 and has a plate 68 secured by fasteners 69 to a vertical wall or support portion 71 of sump 22. The fluidic jet device 67 has a jet sending portion 72 secured to or formed integrally with plate 68 and having an inlet port 73 connected to drive line 32. In this simplified two-drive ratio transmission 10 (FIG. 1), drive line 32 functions as the supply for drive by the shift control system and is employed to supply fluid to the fluidic jet device 67 because it supplies mainline fluid pressure in low and high ratio drives. Generically to include transmissions with more than two ratio drives, to supply fluid to the penultimate and highest ratio drives. In four-speed transmissions, as shown in the above Schaefer and Fox U.S. Pat. No. 3,691,872, the equivalent is the 2-3 shift feed line 415 which feeds during operation in both 3rd and 4th ratio drives. The drive line or penultimate and highest ratio feed line 32 supplies fluid pressure to the vertically directed jet nozzle 74, ending at the top jet outlet surface 75, which provides a vertically directed free fluid jet stream 76 from top surface 75, directed across the gap 77 between the jet nozzle 74 surface 75 and the receiving port 78 in surface 80 of the receiving portion 79. The receiving port 78 has an entry area at face 80 about twice the area of nozzle 74 converging to an area about equal to the area of nozzle 74, as shown in FIG. 6 and described below, but the receiving port may have a straight bore receiving port having an area about twice the area of nozzle 74. The receiving port 78 has a larger area than the nozzle as the free jet stream 76 spreads and to accommodate for alignment tolerance variations of the nozzle and receiving port. In the receiving portion 79, the receiving port 78 is connected to a delivery port 81 connected to low sump fluid signal line 82, which is connected to spring chamber 45 of shift valve 35. The sump 22 has a normal operating fluid or oil level range including the normal fluid level range from the full fluid level, FULL, down to the add oil level, ADD, and a lower operating oil level range. Below the normal operating oil level range, there is an abnormal operating fluid level range, an improper low fluid level, beginning at the transition or modified shift abnormally low fluid level, MOD. SHIFT LOW. When the fluid level is in the normal operating range, fluid in the gap 77 dissipates by turbulence, the jet stream 76, so no low fluid signal pressure is developed at the receiving port 78, and the low fluid level signal line 82 exhausts spring chamber 45 for normal operation of the automatic shift valve 35. When the fluid level descends to the transition line, MOD. SHIFT LOW, at the top of the abnormally low fluid level range, which is at or slightly above the top outlet surface 75 of jet sending portion 72, and mainline fluid pressure is supplied by drive line 32 to supply nozzle 74, the nozzle provides jet stream 76. Since there is little or no fluid in the gap 77, the jet stream in air has laminar flow and impinges in receiving port 78 to develop the low sump fluid level signal in line 82 and spring chamber 45. The low sump fluid level signal is sufficient in high ratio drive to downshift and in low ratio drive to hold the shift valve 35 in downshifted position. The fluidic jet device 67 provides an abrupt change in the signal pressure in line 82 with a small change in sump fluid level at the transition level or modified shift level between the normal and abnormal fluid level ranges. The control system fluid pressure source, pump 26 and regulator valve 28, supplies substantially proper operating pressure to mainline 27 and the control system for substantially proper positive transmission operation, to avoid improper operation, such as excessive slipping of ratio devices 16, 17, or loss or lubrication and cooling supply, in both the normal and abnormal shifting phases. The automatic low sump fluid level responsive change from normal shift operation to abnormal shift operation will change and reduce transmission performance and advise the operator of the abnormally low sump fluid level.

The modified shift low fluid level pressure signal in line 82 is also used to actuate a pressure switch signal system 84, having a normally open pressure switch which closes in response to low fluid level signal pressure in line 82 and completes a sound or light signal circuit.

FIG. 2 shows a modified structural arrangement of the components in the sump 86 of a transmission 87 having a housing 88 which is functionally like the above-described transmission 10 of FIG. 1. In FIG. 2, the controls have the same valves as FIG. 1, in valve body 89 mounted on support portion 91 of housing 88. The intake screen 92 is supported on support struts 93 connected to valve body 89 and also providing the intake line. The fluidic jet device 94, specifically described below and shown in more detail in FIG. 6, is secured to the lower surface of valve body 89. The FIG. 6 fluidic jet device 94 has one-piece construction with a vertical support portion 95, a horizontally projecting lower sending portion 96, and a horizontally projecting upper receiving portion 97. The drive line 98, which is supplied in the penultimate and highest ratio drives, is connected to a passage 99 extending from the top surface 101, down through the support portion 95 and then horizontally into the lower sending portion 96. A restricted nozzle 102 connects the passage 99 through the sending portion 96 between passage 99 and the top outlet surface 103 of sending portion 96 to provide a fluid jet stream 105 directed across gap 104 toward the conical receiving port 106 in the lower inlet surface 107 of receiving portion 97. The conical receiving port 106 is connected by passage 108, having about the same diameter as nozzle 102, to passage 109 connected to low fluid level signal line 111.

The modified portion of a further modification is shown in FIG. 3 with reference to FIG. 1 and the above description and employing; in FIG. 3, the same reference numerals, double-primed, for like parts. In the FIG. 3 modified transmission and control, the shift valve 35" is prevented from upshifting, but is not downshifted by the abnormally low fluid level signal. Since this FIG. 3 modified transmission and control is the same as the above-described FIG. 1 transmission and control system, except for the connection of abnormally low sump fluid level signal line 82" to shift valve 35", only this modified portion is shown in FIG. 3. The shift valve 35" has the same automatic shift components which function in the same way and the same connecting lines and exhausts, the governor line 19", exhausts 54" and 56", low and high ratio lines 52" and 55", as shown, and the equivalents of detent line 63 and ports 64, 65, and drive line 32 [not shown]. The spring 42" is similarly located in spring chamber 45" and seated on abutment 43". The control valve element 39" is modified by making land 39f" wider so it will, in the upshift position, block port 112 of low fluid level signal line 82". The spring chamber 45" also has restricted exhaust 113 which has sufficient flow capacity to permit normal automatic shift operation during normal fluid level operation, when the exhaust provided by low fluid level signal port 112 and line 82", is blocked when shift valve 35" is in upshift position.

Thus the abnormal low sump fluid level signal, when supplied by the fluidic jet device 67 to line 82" will, when the shift valve 35" is in downshift position, enter via signal port 112 to spring chamber 45" and prevent an upshift. Exhaust 113 is small, so sufficient low fluid signal pressure develops in spring chamber 45". After an automatic upshift when abnormal low sump fluid level signal is provided in line 82" to signal port 112, signal port 112 will be blocked by land 39f" so the shift valve 35" will not be downshifted.

A further bilevel responsive control modification, shown in FIGS. 4 and 5, is employed in a transmission 10', like the transmission 10 of FIG. 1, so like reference numerals, primed, are used and reference to the above description of FIG. 1 is made for similar parts. The transmission 10' has multiratio gearing 11' connecting input shaft 12' to output shaft 14' in low ratio drive when low device 16' is supplied with fluid and in high ratio drive when high device 17' is supplied with fluid. The controls have output governor 18' supplying governor line 19' with governor pressure. The transmission housing 21' supports gearing 11' and has attached to its lower portion sump 22' which also completes the lower portion of the housing 21'. Intake screen 23' is located in the bottom of sump 22' and connected by intake line 24' to pump 26' which supplies mainline 27'. Mainline pressure is regulated by regulator valve 28' and overage line 29' connected to the lubrication system, LUBE. Manual valve 31' supplies drive line 32' supplies fluid in both the low and high ratio drives which, with general reference to multiratio transmissions, are the penultimate and highest ratio drives.

The shift valve 35' is the same as FIG. 1 shift valve 35 and has the same passages and exhausts, indicated by primed numerals as shown diagrammatically in FIG. 5, and is located in valve body 36' positioned in the top of the sump 22' as shown in FIG. 4, and supported by a support [not shown] on housing 21'. A modulator pressure regulator valve, like valve 61 shown in FIG. 1, supplies inverted modulator pressure to modulator line 57'. A detent valve, like valve 62 shown in FIG. 1, supplies detent pressure to detent line 63' and ports 64' and 65'. In both FIGS. 1 and 5 the shaft valve 35 or 35' is the 1-2 shift valve in a two-speed transmission and may be the 3-4 shift valve in a four-speed transmission as shown in the above U.S. Pat. No. 3,691,872 Schaefer et al.

The fluidic jet device 67', shown in FIG. 4, is positioned in the transmission housing 21 above the fluid level at all times, and is suitably fastened to and supported by the housing 21. The particular position and direction of the fluid jet stream 76' is not important. The fluidic jet device 67' similarly has a support portion 68', a jet sending portion 72', and receiving portion 79'. The drive line 32' is connected by inlet port 73' to feed jet nozzle 74' providing, beginning at surface 75', the fluid jet stream 76' directed toward receiving port 78' and connected to delivery port 81' in surface 80'. The jet nozzle 74' has a diameter about half as large as the diameter of the receiving port 78' to provide some tolerance for jet stream spread or diffusion and tolerance variation, such as alignment, and to provide a fluidic jet device providing a large decrease in the signal pressure when the fluid becomes aerated.

The delivery port 81' is connected by a normal operating fluid level signal line 116 to a reversing valve 117 which, in the absence of the normal operating fluid level signal pressure, provides abnormal sump fluid level signal pressure in signal line 82', as in FIG. 1, to pressure switch signal system 84' and to shift valve 35' to prevent operation in the highest ratio drive. The reversing valve 117 has a valve element 118 having equal diameter lands $a$ and $b$ in bore 119. In the absence of a normal sump fluid level signal in line 116 connected to chamber 121, the spring 122 in spring chamber 123 vented by exhaust 124 biases valve element 118 to the open position shown and connects drive line 32' to provide signal pressure in abnormal sump pressure signal line 82'. When the normal fluid level signal pressure is supplied in line 116 to chamber 121 to act on land 118a, valve element 118 is moved to closed position, blocking drive line 32' and connecting abnormal sump fluid level signal line 82' to exhaust 125.

The operation of the transmission gearing 11' and automatic shift control by shift valve 35' is the same as described above with reference to FIG. 1. In the normal sump fluid level range between high level, HIGH OIL, and low level, LOW OIL, FIG. 4, normal nonaerated fluid is supplied by drive line 32' to fluidic jet device 67' which then provides a jet stream 76' across the air gap 77' to provide a normal sump fluid level signal in line 116. This normal fluid level signal in line 116 acts on reversing valve 117 which exhausts the abnormal sump fluid level signal line 82' to exhaust 125 to provide normal automatic shifting operation of shift valve 35'.

If the sump fluid level rises to an abnormal high level, HIGH OIL, the fluid contacts a lower rotating portion of the gearing 11' which aerates the fluid. If the sump fluid level decreases to an abnormal low level, LOW OIL, the screen 23' or other specially located inlet will permit air to enter intake line 24' and aerate the fluid. The fluidic jet device 67' does not provide a sufficiently homogenous and laminar flow jet stream 76' when supplied with aerated fluid to provide sufficient normal fluid level signal pressure in line 116 to actuate reversing valve 117 against the bias force of its spring 122. Then reversing valve 117 supplies abnormal sump fluid level signal pressure in line 82' to shift valve 35' to prevent upshifts to the highest ratio drive and to provide a downshift from the highest ratio drive to the penultimate ratio drive. When the sump fluid level is normal and the fluid in a nonaerated state, the fluidic jet device 67' provides a normal sump fluid level signal pressure in signal line 116 which signal pressure is reversed by reversing valve 117 to exhaust sump fluid level signal line 82' to permit normal automatic shift operation of shift valve 35'. The fluidic jet device 67', since the jet stream 76' is in air, is more sensitive to aerated air and so the jet device, in response to a low degree of aeration of the fluid, discontinues the normal fluid level signal. Since the fluid in the transmission control system is under pressure at this low degree of aeration, the transmission operating pressure is substantially proper to provide proper positive operation of the transmission.

The modified fluidic jet device 94' shown in FIG. 7 is like the fluidic jet device 94 shown in FIG. 6 and described above, so like reference numerals, primed, are used with reference to the above description. The fluidic jet device 94' (FIG. 7), like the fluidic jet device 94 (FIG. 6) provides in the same way an abnormal low sump fluid level pressure signal to line 111 when the sump fluid temperature is in the normal temperature range, and may be similarly used in the above-described transmission and control system shown in FIG. 1. When the sump fluid temperature is low, less than the normal fluid operating temperature range, the fluid level may be falsely or deceptively temporarily abnormally low, but on warming with normal transmission operation to a normal temperature, the level would increase to the normal sump fluid level range. In order to prevent a false low fluid signal at such low temperatures, a temperature responsive flow control means is provided to reduce or block flow of fluid to or in the jet nozzle, or to block the jet stream, so that abnormally low fluid level will not provide an abnormal low fluid level signal at such low temperatures below the operating temperature range. In FIG. 7, such a temperature responsive flow control means is provided by the long jet nozzle 102' having a length to diameter ratio of about 20:1, so that at such low temperatures, the jet stream 105' and abnormally low fluid level signal in line 111' will not be provided, even though the sump fluid level is abnormally low. Other temperature responsive flow control means, such as a temperature responsive bimetallic strip, a capsule, or other thermal motor controlled valve flow reducing member can be employed to close or restrict passage 99' or to interfere with jet stream 105' so the jet stream does not develop a low fluid level signal in low fluid level signal line 111'.

It will be appreciated that other modifications of the invention may be made.

I claim:

1. In a transmission: a housing having a sump with a normal fluid level range and an abnormal fluid level beyond said normal fluid level range; a multiratio gear unit having drive means for establishing low and high ratio drives mounted in said housing; a mainline; a fluid pressure source having a suction inlet in said sump and applying substantially proper regulated pressure when the fluid level in said sump is in said normal fluid level range and at said abnormal fluid level to said mainline for proper positive transmission operation; shift control means for selectively controlling said drive means to selectively establish said low and high ratio drives; level sensor means mounted in said housing providing an abnormal fluid level signal in response to the fluid level in said sump being at said abnormal fluid level beyond said normal fluid level range; and shift inhibiting means connected to said level sensor means and said shift control means operative in response to said abnormal fluid level signal to change said shift control means operation to provide abnormal operation in one operating phase and provide normal proper positive transmission operation in another operating phase.

2. In a transmission: a housing having a sump with a normal fluid level range and an abnormal fluid level beyond said normal fluid level range; a multiratio gear unit having fluid operated means for establishing low and high ratio drives mounted in said housing; a mainline; a fluid pressure source having a suction inlet in said sump and supplying substantially proper regulated pressure when the fluid level in said sump is in said normal fluid level range and at said abnormal fluid level to said mainline for proper positive transmission operation; shift control means connected to said mainline and said fluid operated means for selectively controlling the connection of said mainline to said fluid operated means to selectively establish said low and high ratio drives; level sensor means mounted in said housing providing an abnormal fluid level signal in response to the fluid level in said sump being at said abnormal fluid level beyond said normal fluid level range; and shift inhibiting means connected to said level sensor means and said shift control means operative in response to said abnormal fluid level signal to inhibit said shift control means operation to provide abnormal operation preventing a shift to one of said ratio drives and provide normal proper positive transmission operation in another of said ratio drives.

3. In a transmission: a housing having a sump with a normal fluid level range and an abnormal fluid level beyond said normal fluid level; a multiratio gear unit having fluid operated means for establishing low and high ratio drives mounted in said housing; a mainline; a fluid pressure source having a suction inlet in said sump and supplying substantially proper regulated pressure when the fluid level in said sump is in said normal fluid level range and at said abnormal fluid level to said mainline for proper positive transmission operation; shift control means connected to said mainline and said fluid operated means for selectively connecting said mainline to said fluid operated means to selectively establish said low and high ratio drives; level sensor means mounted in said sump providing an abnormal fluid level signal in response to the fluid level in said sump being at an abnormal fluid level; and shift inhibiting means connected to said level sensor means and said shift control means and operative in response to said abnormal fluid level signal to inhibit said shift control means operation to prevent a shift from said low ratio drive to said high ratio drive and provide proper positive transmission operation in said low ratio drive.

4. In a transmission: a housing having a sump with a normal fluid level range and an abnormal low fluid level below said normal fluid level; a multiratio gear unit having fluid operated means for establishing low and high ratio drives mounted in said housing; a mainline; a fluid pressure source having a suction inlet in said sump and supplying substantially proper regulated pressure when the fluid level in said sump is in said normal fluid level range and at said abnormal fluid level to said mainline for proper positive transmission operation; shift control means connected to said mainline and said fluid operated means selectively connecting said mainline to said fluid operated means to selectively establish said low and high ratio drives; fluidic jet level sensor means mounted in said sump and having a receiving port, a jet nozzle having an outlet substantially at said abnormal low fluid level and facing said receiving port across a gap and connected to said mainline and providing a fluid jet stream from said outlet face across said gap to provide a low fluid level signal in response to the fluid level in said sump being substantially at said abnormal low fluid level; and to discontinue said fluid jet stream and said low fluid level signal in response to the fluid level in said sump being in said normal fluid level range; and shift inhibiting means connected to said fluidic jet level sensor means and said shift control means and operative in response to said low fluid level signal to inhibit said shift control means operation to prevent a shift from said low ratio drive to said high ratio drive and provide proper positive operation in said low ratio drive.

5. The invention defined in claim 4, and said multiratio gear unit having fluid operated drive means providing (a plurality of ratio drives including said low and high ratio drives) which are respectively the penultimate and the highest ratio drives; said shift control means being mounted in the upper portion of said sump and including governor means providing an output speed signal; torque demand means providing a torque demand signal, and automatic shift valve means operative in response to said output speed signal and said torque demand signal for automatic shifting between a plurality of ratio drive positions including low and high ratio drive positions, selectively connecting said mainline to said fluid operated drive means for selectively establishing said plurality of ratio drives including said low and high ratio drives, having a fluid operated disabling means portion of said inhibiting means normally permitting automatic shifting and operative in response to fluid pressure to prevent an upshift from said low to high ratio drive and providing a supply feed from said mainline only in said low and high ratio drives; said level sensor means being connected to said supply feed for mainline supply and having said jet nozzle outlet at said low fluid level and said gap in the lower portion of said normal fluid level range with said jet stream directed upwardly from substantially said low fluid level into the lower portion of said normal fluid level range, being mounted on the lower side of said shift control means and projecting downwardly to locate said jet nozzle outlet at said low fluid level, and said receiving port having a conical receiving portion having an inlet area about twice the area of said jet nozzle; said shift inhibiting means including said disabling means portion operative in response to said low fluid level signal to control said automatic shift valve means to prevent a shift from said low ratio drive to said high ratio drive.

6. The invention defined in claim 4, and said inhibiting means being operative in response to said low fluid level signal first received in said low ratio drive to prevent a shift from low to high ratio drive and first received in said high ratio drive to provide a shift from high to low ratio drive.

7. The invention defined in claim 4, and said inhibiting means being operative in response to said low fluid level signal first received in said low ratio drive to prevent a shift from low to high ratio drive and first received in said high ratio drive to permit normal high ratio drive until there is an automatic downshift to low ratio drive.

8. The invention defined in claim 4, and said fluidic jet level sensor means having temperature-responsive flow control means operative at low temperatures below the normal operating temperature range of the fluid in said sump to limit flow to and through said jet nozzle to prevent a jet stream providing a low fluid signal at low fluid level.

9. In a transmission: a housing having a sump with a normal fluid level range, an abnormal high fluid level above and an abnormal low fluid level below said normal fluid level range; a multiratio gear unit having a rotary gearing mounted in said housing above said normal fluid level range and contacting fluid at said abnormal high fluid level and aerating the fluid in said sump, and having the fluid operated means for establishing low and high ratio drives; a mainline; a fluid pressure source having pump means, a suction inlet in said sump ending at said abnormal low fluid level below said normal fluid level range and supplying substantially proper regulated pressure when the fluid level in said sump is in said normal fluid level range and at said abnormal fluid level, which is aerated when said sump fluid level is at or below said low fluid level and at said high fluid level and is nonaerated when said sump fluid level is in said normal fluid level range, to said mainline for proper positive transmission operation; shift control means connected to said mainline and said fluid operated means selectively connecting said mainline to said fluid operated means to selectively establish said low and high ratio drives; level sensor means mounted in said sump providing an abnormal fluid level signal in response to aeration of fluid in said sump; and shift inhibiting means connected to said level sensor means and said shift control means operative in response to said abnormal fluid level signal to inhibit said shift control means operation to prevent a shift from said low ratio drive to said high ratio drive and provide proper positive operation in said low ratio drive.

* * * * *

UNITED STATES PATENT AND TRADEMARK OFFICE
CERTIFICATE OF CORRECTION

PATENT NO. : 4,075,912
DATED : February 28, 1978
INVENTOR(S) : Robert H. Schaefer It is certified that error appears in the above-identified patent and that said Letters Patent are hereby corrected as shown below:

Column 6, line 46, after "32'" insert -- only in drive position [D]. As pointed out above, drive line 32' --

Column 8, line 51, "applying" should read -- supplying --

Signed and Sealed this

Seventeenth Day of October 1978

[SEAL]

Attest:

RUTH C. MASON
Attesting Officer

DONALD W. BANNER
Commissioner of Patents and Trademarks